3,134,719
CALCIUM PHOSPHATES IN TABLET COMPRESSING
Prabhakar Ranchhordas Sheth, Pearl River, N.Y., and James Henry Wiley, Westwood, N.J., assignors to American Cyanamid Company, Stamford, Conn., a corporation of Maine
No Drawing. Filed Apr. 5, 1962, Ser. No. 185,200
8 Claims. (Cl. 167—82)

This invention relates to the production of tablets of therapeutic materials. More particularly, this invention relates to the direct compression of tablets by the use of calcium salts of phosphoric acid and to the tablets so produced.

In the pharmaceutical industry it is a well-known fact that very few crystalline or powdered materials can be compressed into suitable tablets on automatic tableting equipment in their crystalline or powdered form. The practice has developed of first preparing a granulation of the material, because it is known that the grain-like structure thus formed is suitable for compression into tablets. There are two well-known methods of preparing a granulation, namely, the wet granulating process, and the dry granulating process which is also known as "slugging."

The method of preparing a granulation according to the wet granulating process consists of moistening the dry powder, with or without the addition of an adhesive substance, until the whole is converted into a crumbly mass. The mass is then forced through a screen in order to reduce the material to a grain-like structure of small granules. The most commonly used moistening agent is, of course, water although other solvents are well-known for this purpose. It is also common practice to add a substance such as gelatin, starch, or gum acacia in order to assist in granulating the material.

The method of preparing a granulation according to the dry granulating process consists of pre-compressing the dry powder into oversized tablets or "slugs." These oversized tablets or "slugs" are then broken into a granulation of substantially uniform size.

The present invention is based on the discovery that the addition or not less than about 20% by weight of a calcium salt of phosphoric acid, or a mixture of calcium salts of phosphoric acid, to crystalline or powdered materials renders them capable of being compressed directly into suitable tablets on automatic tableting equipment. The present invention completely eliminates the necessity of first preparing a granulation of crystalline or powdered materials before compressing them into tablets. In the tableting art, the elimination of the necessity of first preparing a granulation results in a host of economic advantages. Insofar as the wet granulating process is concerned, the wet mixing, drying, and screening operations are eliminated. Insofar as the dry granulating process is concerned, the pre-compression, breaking, and screening operations are eliminated. In both cases, the amount of equipment, labor and floor space needed is vastly reduced. Furthermore, since by practicing the present invention a compressed tablet can be made eliminating all but the steps of mixing and compressing, there results a great saving of time.

The present invention is not to be confused with the use of small amounts of calcium salts of phosphoric acid as lubricants in tablet compressing. Lubricants are rarely used in excess of 5% by weight in tablet compressing for the purpose of preventing sticking in the die and promoting the flow of powder in the hopper. Also, the present invention is not to be confused with the use of finely milled calcium salts of phosphoric acid as fillers in tablet compressing. Fillers have heretofore always been used with a granulation, whereas the present invention completely eliminates the necessity of first preparing a granulation.

The calcium salts of phosphoric acid that may be used in practicing the present invention are monobasic calcium phosphate, $Ca(H_2PO_4)_2$; dibasic calcium phosphate, $CaHPO_4$; and tribasic calcium phosphate, $Ca_3(PO_4)_2$. These calcium salts of phosphoric acid may be either anhydrous or hydrated with up to two moles of water per mole of salt. The calcium salts of phosphoric acid operative in the novel process of the present invention are "unmilled," that is, at least about 25% by weight is of extremely large particle size. The extremely large particle sizes contemplated by the present invention range from 125 microns to a practical upper limit of 1500 microns. Particles of 125 microns in size will pass through a #100 U.S. Standard Mesh Sieve but will be retained on a #120 U.S. Standard Mesh Sieve. Particles of 1500 microns in size will be retained on a #14 U.S. Standard Mesh Sieve. These calcium salts of phosphoric acid possess a bulk density ranging from 30 to 65 lbs./cu. ft. (0.5–1.0 g./cc.).

It is indeed surprising that the addition of calcium salts of phosphoric acid, having less than about 25% by weight of particle size larger than 125 microns, to crystalline or powdered materials does not render them capable of being compressed directly into suitable tablets on automatic tableting equipment.

Many materials which heretofore were exceedingly difficult to prepare in tablet form may now be readily tableted by the practice of the present invention. In practicing the present invention, it is only necessary that the crystalline or powdered materials to be tableted are compatible with the calcium salts of phosphoric acid. The material to be tableted may be mixed directly with the calcium salt of phosphoric acid, or with a mixture of such salts, or it may be dissolved in a solvent and the resulting solution may be mixed with the calcium salts, after which evaporation of the solvent is effected. Furthermore, the maximum proportion of calcium phosphate salts which may be employed in practicing the present invention may be very close to 100% by weight in the case of those medicaments which are administered in small amount.

In practicing the present invention, lubricants such as magnesium stearate, fillers such as lactose, or disintegrators such as starch may be added to the mixture of the calcium salts and the crystalline or powdered material prior to tableting on automatic tableting equipment.

The calcium salts of phosphoric acid employed in the examples, which are illustrative of the present invention, had the following physical characteristics.

Monobasic calcium phosphate monohydrate: This material had a bulk density of 65 lbs./cu. ft. and a particle size distribution as follows:

| | Microns |
|---|---|
| 6% by weight | Up to 74 |
| 66% by weight | 74–125 |
| 28% by weight | 125–175 |

Dibasic calcium phosphate dihydrate: This material had a bulk density of 59 lbs./cu. ft. and a particle size distribution as follows:

| | Microns |
|---|---|
| 27% by weight | Up to 74 |
| 17% by weight | 74–125 |
| 56% by weight | 125–840 |

Anhydrous tribasic calcium phosphate: This material had a bulk density of 31 lbs./cu. ft. and a particle size distribution as follows:

| | Microns |
|---|---|
| 5% by weight | Up to 250 |
| 90% by weight | 250–1410 |
| 5% by weight | 1410–1500 |

*Example 1*

In a suitable mechanical mixer were mixed 3.6 parts of 9α-fluoro-16α-hydroxyprednisolone, 88.3 parts of dibasic calcium phosphate dihydrate, 5.4 parts of corn starch and 2.7 parts of magnesium stearate. The resulting powder was tableted in an automatic tableting machine using a 5/16" x 9/64" oblong punch. The tablets produced were of excellent quality, having an average hardness of 8.7 (Strong Cobb Units) and an average disintegration time of five minutes. Friability, weight variation, and appearance were fully acceptable. These tablets were formed at normal machine speed and no difficulties were encountered.

*Example 2*

In a suitable mechanical mixer were mixed 1.7 parts of 3-(1-piperidyl)-1-phenyl-1-cyclohexyl-1-propanol hydrochloride, 92.9 parts of dibasic calcium phosphate dihydrate, 5.0 parts of corn starch and 0.5 part of magnesium stearate. The resulting powder was compressed on an automatic tableting machine using a 3/8" flat faced beveled with bisecting line punch. The tablets produced were of excellent quality, having an average hardness of 10.0 (Strong Cobb Units) and an average disintegration time of less than two minutes. Friability, weight variation, and appearance were fully acceptable. These tablets were formed at normal machine speed and no difficulties were encountered.

*Example 3*

In a suitable mechanical mixer were mixed 22.9 parts of N,N - dimethyl-N'-(2-pyridyl)-N'-(5-chloro-2-thenyl) ethylenediamine citrate, 71.1 parts of dibasic calcium phosphate dihydrate, 5.0 parts of corn starch and 1.0 part of magnesium stearate. The resulting powder was compressed on an automatic tableting machine using a 1/4" deep concave punch. The tablets produced were of excellent quality, having an average hardness of 10.0 (Strong Cobb Units) and an average disintegration time of less than two minutes. Friability, weight variation, and appearance were fully acceptable. These tablets were formed at normal machine speed and no difficulties were encountered.

*Example 4*

In a suitable mechanical mixer were mixed 48.2 parts of digitalis powder, 42.8 parts of dibasic calcium phosphate dihydrate, 5.4 parts of corn starch, 1.8 parts of talc and 1.8 parts of magnesium stearate. The resulting powder was compressed on an automatic tableting machine using a 9/32" standard concave punch. The tablets produced were of excellent quality, having an average hardness of 8.0 (Strong Cobb Units) and an average disintegration time of eleven minutes. Friability, weight variation, and appearance were fully acceptable. These tablets were formed at normal machine speed and no difficulties were encountered.

*Example 5*

In a suitable mechanical mixer were mixed 33.1 parts of 3-sulfanilamido-6-methoxypyridazine, 57.3 parts of dibasic calcium phosphate dihydrate, 5.2 parts of corn starch, 3.0 parts of alginic acid and 1.5 parts of magnesium stearate. The resulting powder was compressed on an automatic tableting machine using a 1/2" concave with bisecting line punch. The tablets produced were of excellent quality, having an average hardness of 15.0 (Strong Cobb Units) and an average disintegration time of 90 seconds. Friability, weight variation, and appearance were fully acceptable. These tablets were formed at normal machine speed and no difficulties were encountered.

*Example 6*

In a suitable mechanical mixer were mixed 21 parts of 3-diethylamino-1-cyclohexyl-1-phenyl-1-propanol ethochloride previously coated with 21 parts of Carbowax 6000, 48.8 parts of monobasic calcium phosphate monohydrate, 5.9 parts of corn starch, 2.5 parts of alginic acid and 0.8 part of magnesium stearate. The resulting powder was compressed on an automatic tableting machine using a 1/4" deep concave punch. The tablets produced were of excellent quality, having an average hardness of 5.0 (Strong Cobb Units) and friability, weight variation, and appearance were fully acceptable. These tablets were formed at normal machine speed and no difficulties were encountered.

*Example 7*

In a suitable mechanical mixer were mixed 24.8 parts of 3-diethylamino-1-cyclohexyl-1-phenyl - 1 - propanol ethochloride previously coated with 24.8 parts or Carbowax 6000, 39.6 parts of anhydrous tribasic calcium phosphate, 6.9 parts of corn starch, 3.0 parts of alginic acid and 1.0 part of magnesium stearate. The resulting powder was compressed on an automatic tableting machine using a 1/4" deep concave punch. The tablets produced were of excellent quality, having an average hardness of 5.0 (Strong Cobb Units) and an average disintegration time of seven minutes. Friability, weight variation, and appearance were fully acceptable. These tablets were formed at normal machine speed and no difficulties were encountered.

*Example 8*

In a suitable mechanical mixer were mixed 0.9 part of 3-(1-piperidyl)-1-phenyl-1-cyclohexyl-1-propanol hydrochloride, 92.4 parts of monobasic calcium phosphate monohydrate, 6.2 parts of corn starch and 0.5 part of magnesium stearate. The resulting powder was compressed on an automatic tableting machine using a 5/16" flat faced beveled punch. The tablets produced were of excellent quality, having an average hardness of 8.0 (Strong Cobb Units) and an average disintegration time of 3.5 minutes. Friability, weight variation, and appearance were fully acceptable. These tablets were formed at normal machine speed and no difficulties were encountered.

*Example 9*

In a suitable mechanical mixer were mixed 23 parts of N,N-dimethyl-N'-(2-pyridyl)-N'-(5 - chloro - 2 - thenyl)-ethylenediamine citrate, 76 parts of monobasic calcium phosphate monohydrate, and 1 part of magnesium stearate. The resulting powder was compressed on an automatic tableting machine using a 1/4" deep concave punch. The tablets produced were of excellent quality, having an average hardness of 5.0 (Strong Cobb Units) and an average disintegration time of fifteen minutes. Friability, weight variation, and appearance were fully acceptable. These tablets were formed at normal machine speed and no difficulties were encountered.

Example 10

In a suitable mechanical mixer were mixed 23 parts of N,N-dimethyl-N'-(2-pyridyl)-N'-(5-chloro-2-thenyl)ethylenediamine citrate, 76 parts of anhydrous tribasic calcium phosphate, and 1.0 part of magnesium stearate. The resulting powder was compressed on an automatic tableting machine using a ¼" deep concave punch. The tablets produced were of excellent quality, having an average hardness of 10.0 (Strong Cobb Units) and an average disintegration time of seven minutes. Friability, weight variation, and appearance were fully acceptable. These tablets were formed at normal machine speed and no difficulties were encountered.

Example 11

In a suitable mechanical mixer were mixed 0.3 part of 9α-fluoro-16α-hydroxyprednisolone, 97.2 parts of anhydrous tribasic calcium phosphate, 2.0 parts of corn starch and 0.5 part of magnesium stearate. The resulting powder was compressed on an automatic tableting machine using a 9/32" standard concave with bisecting line punch. The tablets produced were of excellent quality, having an average hardness of 13.0 (Strong Cobb Units) and an average disintegration time of thirty minutes. Friability, weight variation, and appearance were fully acceptable. These tablets were formed at normal machine speed and no difficulties were encountered.

Example 12

In a suitable mechanical mixer were mixed 1.5 parts of 3-(1-piperidyl)-1-phenyl-1-cyclohexyl-1-propanol hydrochloride, 4.5 parts of corn starch, 0.5 part of magnesium stearate and 93.5 parts of a mixture composed of 5 parts of monobasic calcium phosphate monohydrate and 88.5 part of dibasic calcium phosphate dihydrate. The resulting powder was compressed on an automatic tableting machine using a ⅜" flat face beveled punch. The tablets produced were of excellent quality, having an average hardness of 8.0 (Strong Cobb Units) and an average disintegration time of less than 1 minute. Friability, weight variation and appearance were fully acceptable. These tablets were formed at normal machine speed and no difficulties were encountered.

Example 13

In a suitable mechanical mixer were mixed 1.5 parts of d-1-phenyl-2-aminopropane-sulfate, 4.5 parts of corn starch, 0.5 part of magnesium stearate and 93.5 parts of a mixture composed of 5 parts of dibasic calcium phosphate dihydrate and 88.5 parts of monobasic calcium phosphate monohydrate. The resulting powder was compressed on an automatic tableting machine using a ⅜" flat face beveled punch. The tablets produced were of excellent quality, having an average hardness of 8.0 (Strong Cobb Units) and an average disintegration time of less than 3 minutes. Friability, weight variation and appearance were fully acceptable. These tablets were formed at normal machine speed and no difficulties were encountered.

Example 14

In a suitable mechanical mixer were mixed 1.5 parts of 3-(1-piperidyl)-1-phenyl-1-cyclohexyl-1-propanol-hydrochloride, 4.5 parts of corn starch, 0.5 part of magnesium stearate and 93.5 parts of a mixture composed of 5 parts of monobasic calcium phosphate monohydrate and 88.5 parts of anhydrous tribasic calcium phosphate. The resulting powder was compressed on an automatic tableting machine using a ⅜" flat face beveled punch. The tablets produced were of excellent quality having an average hardness of 7.0 (Strong Cobb Units) and an average disintegration time of less than 1 minute. Friability, weight variation and appearance were fully acceptable. These tablets were formed at normal machine speed and no difficulties were encountered.

Example 15

In a suitable mechanical mixer were mixed 1.5 parts of d-1-phenyl-2-aminopropane sulfate, 4.5 parts of corn starch, 0.5 part of magnesium stearate and 93.5 parts of a mixture composed of 5 parts of anhydrous tribasic calcium phosphate and 88.5 parts of dibasic calcium phosphate dihydrate. The resulting powder was compressed on an automatic tableting machine using a ⅜" flat face beveled punch. The tablets produced were of excellent quality having an average hardness of 15.0 (Strong Cobb Units) and an average disintegration time of less than 1 minute. Friability, weight variation and appearance were fully acceptable. These tablets were formed at normal machine speed and no difficulties were encountered.

Example 16

In a suitable mixer were mixed 1.5 parts of 3-(1-piperidyl)-1-phenyl-1-cyclohexyl-1-propanol hydrochloride, 4.5 parts of corn starch, 0.5 part of magnesium stearate and 93.5 parts of a mixture composed of 10 parts of monobasic calcium phosphate monohydrate, 10 parts of anhydrous tribasic calcium phosphate and 73.5 parts of dibasic calcium phosphate dihydrate. The resulting powder was compressed on an automatic tableting machine using a ⅜" flat face beveled punch. The tablets produced were of excellent quality having an average hardness of 11.0 (Strong Cobb Units) and an average disintegration time of less than 1 minute. Friability, weight variation and appearance were fully acceptable. These tablets were formed at normal machine speed and no difficulties were encountered.

Example 17

In a suitable mechanical mixer were mixed 1.5 parts of d-1-phenyl-2-aminopropane sulfate, 4.5 parts of corn starch, 0.5 part of magnesium stearate and 93.5 parts of a mixture composed of 10 parts of dibasic calcium phosphate dihydrate, 10 parts of anhydrous tribasic calcium phosphate and 73.5 parts of monobasic calcium phosphate monohydrate. The resulting powder was compressed on an automatic tableting machine using a ⅜" flat face beveled punch. The tablets produced were of excellent quality, having an average hardness of 7.0 (Strong Cobb Units) and an average disintegration time of less than 2 minutes. Friability, weight variation and appearance were fully acceptable. These tablets were formed at normal machine speed and no difficulties were encountered.

Example 18

In a suitable mechanical mixer were mixed 1.5 parts of 3-(1-piperidyl)-1-phenyl-1-cyclohexyl-1-propanol hydrochloride, 4.5 parts of corn starch, 0.5 part of magnesium stearate and 93.5 parts of a mixture composed of 10 parts of monobasic calcium phosphate monohydrate, 10 parts of dibasic calcium phosphate dihydrate and 73.5 parts of anhydrous tribasic calcium phosphate. The resulting powder was compressed on an automatic tableting machine using a ⅜" flat face beveled punch. The tablets produced were of excellent quality, having an average hardness of 9.0 (Strong Cobb Units) and an average disintegration time of less than 2 minutes. Friability, weight variation and appearance were fully acceptable. These tablets were formed at normal machine speed and no difficulties were encountered.

What is claimed is:

1. The process of preparing tablets of therapeutic materials comprising the steps of mixing a non-granulated therapeutic material with not less than about 20% by weight of calcium salts of phosphoric acid, at least about 25% by weight of said calcium salts having particle sizes greater than 125 microns, and forming the mixture thus obtained into tablets by compression.

2. The process of preparing tablets of therapeutic materials comprising the steps of mixing a non-granulated therapeutic material with not less than about 20% by weight of monobasic calcium phosphate, at least about 25% by weight of said monobasic calcium phosphate having particle sizes greater than 125 microns, and forming the mixture thus obtained into tablets by compression.

3. The process of preparing tablets of therapeutic materials comprising the steps of mixing a non-granulated therapeutic material with not less than about 20% by weight of dibasic calcium phosphate, at least about 25% by weight of said dibasic calcium phosphate having particle sizes greater than 125 microns, and forming the mixture thus obtained into tablets by compression.

4. The process of preparing tablets of therapeutic materials comprising the steps of mixing a non-granulated therapeutic material with not less than about 20% by weight of tribasic calcium phosphate, at least about 25% by weight of said tribasic calcium phosphate having particle sizes greater than 125 microns, and forming the mixture thus obtained into tablets by compression.

5. A therapeutic tablet consisting essentially of a non-granulated therapeutic material and not less than about 20% by weight of calcium salts of phosphoric acid, at least about 25% by weight of said calcium salts having particle sizes greater than 125 microns.

6. A therapeutic tablet consisting essentially of a non-granulated therapeutic material and not less than about 20% by weight of monobasic calcium phosphate, at least about 25% by weight of said monobasic calcium phosphate having particle sizes greater than 125 microns.

7. A therapeutic tablet consisting essentially of a non-granulated therapeutic material and not less than about 20% by weight of dibasic calcium phosphate, at least about 25% by weight of said dibasic calcium phosphate having particle sizes greater than 125 microns.

8. A therapeutic tablet consisting essentially of a non-granulated therapeutic material and not less than about 20% by weight of tribasic calcium phosphate, at least about 25% by weight of said tribasic calcium phosphate having particle sizes greater than 125 microns.

References Cited in the file of this patent

UNITED STATES PATENTS

| | | |
|---|---|---|
| 2,030,461 | Moss | Feb. 11, 1936 |
| 2,400,292 | Dalton | May 14, 1946 |
| 2,809,917 | Hermelin | Oct. 15, 1957 |
| 2,811,483 | Aterno et al. | Oct. 29, 1957 |
| 2,999,293 | Taff et al. | Sept. 12, 1961 |
| 3,019,169 | Klumpp et al. | Jan. 30, 1962 |
| 3,039,922 | Berger et al. | June 19, 1962 |

FOREIGN PATENTS

| | | |
|---|---|---|
| 606,009 | Canada | Sept. 27, 1960 |